June 13, 1961     H. A. QUIST     2,988,270
TANK GAUGE CALCULATOR
Filed March 31, 1958     2 Sheets-Sheet 1

INVENTOR.
HAROLD A. QUIST
BY
Robert O. Spindle
ATTORNEY

United States Patent Office 2,988,270
Patented June 13, 1961

2,988,270
TANK GAUGE CALCULATOR
Harold A. Quist, Swarthmore, Pa., assignor to Sun Oil Company, Philadelphia, Pa., a corporation of New Jersey
Filed Mar. 31, 1958, Ser. No. 725,145
2 Claims. (Cl. 235—61)

This invention relates to calculating machines, and more particularly to such devices incorporating a graph and a cooperating numerical scale movable relative to each other.

In the chemical and petroleum industries it is frequently necessary to store quantities of liquids for later sale or use. Normal storage facilities include tanks of varying shapes and capacities few of which are sufficiently alike to use a standard volume table. In fact, all tanks used for storage purposes are measured and volume tables calculated after they are built. Each tank has a separate volume table. In this way allowances are made for irregularities in construction as well as for the inclusion of space consuming structures frequently positioned inside the storage vessel.

Once prepared a volume table, or barrelage chart as it is referred to, remains effective for the particular tank until changes take place in its physical structure. Such a table shows the results of carefully calculated volume units such as barrels and fractions thereof against feet and inches of depth inside the tank. Mere reference to this table, however, with a depth measurement of the liquid contents, is not enough to give the stored quantity of liquid required in a particular measuring operation.

Corrections in the measured and the calculated quantities as shown by the volume table, must be made. The standard temperature, for example, used in the sale of petroleum liquid products is 60° F. All temperature effects are corrected to reflect the volume as it would measure at that temperature. It is standard practice, therefore, to measure the depth of stored liquid petroleum products and take the average temperature affecting that stored quantity. With these two measurements the barrel volume is determined from the precalculated depth table and this barrelage is again corrected mathematically to measure the quantity as it would be if the temperature were the accepted normal of 60° F.

The above is the accepted procedure where the storage tank is occupied with the particlar liquid petroleum product for which the precalculated volume table is made. Where, however, the table is compiled for gasoline of a certain specific gravity and another liquid such as fuel oil is pumped into the tank it is necessary to further modify the volume contents as reflected by the table. In this case both the temperature effect and the specific gravity must be considered in determining the corrected volume.

It is a general object of the invention to provide a device which will automatically at a single setting, give the corrected volume of stored liquid contents taking into consideration the affecting temperature, specific gravity of the liquid stored, and the shape of the storage vessel, regardless of external or internal irregularities.

In accordance with the present invention, two movable scale elements are adapted to cooperate in volume reflecting engagement. One of these scale elements is a tape of sufficient length to bear a numerical record of the contents in volume units of the storage tank set off against feet and inch measurements. The scale size and material of which the tape is made are limits on the size of the device.

The second of the movable scale elements is a chart or graph adapted to move transverse the movable tape and in cooperation with the act of winding of the tape in either direction. This chart or graph includes lines adapted to be read against the tape-recorded volumes and depths whereby corrections are made for both specific gravity and temperatures affecting the stored liquids.

The invention lies in the features of construction, combination and arrangement of parts, subsequently fully described and claimed, in which description reference is made to the figures of the drawing as follows:

The problem of determining the stored volumes of liquids, as indicated above, involves the consideration of an irregularly shaped storage volume, and variables of temperature and specific gravity. Volume of the storage vessel is affected by external shape such as ovate spheroids, cylindrical, rectangular shapes and the like. Additionally volume segments inside such tanks may be occupied with structural members or instruments at fixed or varying depths in the storage vessels. It is therefore required that one of the relatively movable elements of the device under consideration make allowances for these volume corrections.

The other of the two movable elements must correct those carefully determined volumes for the variables of specific gravity and temperature effects, in order to arrive at the desired figure, termed the "normal" volume. This volume and its correction differs for every unit of depth in the storage vessel. Specific gravity of the stored liquid affects the volume change of the measured quantity as it responds to temperature conditions. These variables, differently affecting volumes, must be considered against the predetermined volume differences at all depths in the storage tank under consideration. The following descrition of the disclosed mechanism shows a form of device capable of determining the exact stored volume corrected to the required normal condition in any shape or construction of storage vessel.

Figure 1:
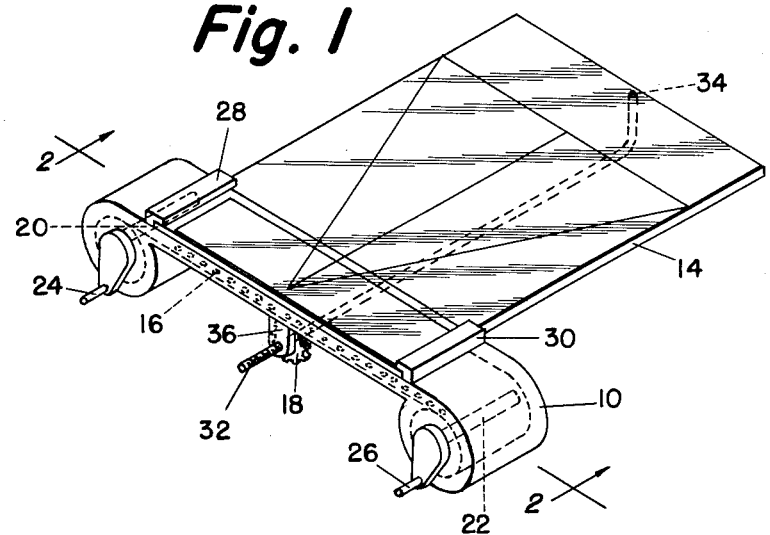
FIGURE 1 is a view in perspective of the device assembled for operation.
Figure 2:
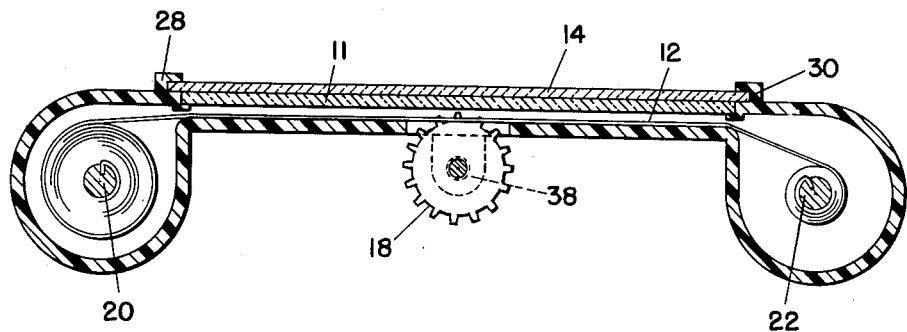
FIGURE 2 is an elevational view partly in section of FIGURE 1 taken on line 2—2.

FIGURES 1 and 2 show the assembled device in its initial setting preliminary to the calculating operation. A frame 10 of any desired shape is adapted to rotatably mount tape 12 in reading position relative to chart 14. Frame 10 mounts a transparent plate 11 between the tape and chart 14 for better operating characteristics and to lend more rigidity to the frame. Tape 12 is slotted as at 16 to engage a toothed wheel 18. Opposed winding reels 20 and 22, in frictional contact with frame 10 to resist the winding and re-winding movement without involuntarily unwinding, engage the ends of tape 12 and hold the apertures 16 on toothed wheel 18. Handles 24 and 26 engage reels 20 and 22 respectively and afford an easy means for moving the tape.

On top of the frame 10 a pair of guides 28 and 30 are fastened and adapted to clear the tape-occupied portion and transparent plate 11, allowing the tape to move without hindrance. Chart 14 fits into the guides and is thus positioned for cooperative movement with tape 12, the chart moving above plate 11 transverse the tape which moves longitudinally of the frame beneath plate 11.

Both the moving elements are adapted to cooperate with each other. This is achieved by threading operating rod 32 with the proper pitch of thread and determining the tooth pitch and diameter of toothed wheel 18 in relation thereto. To make an operating device, rod 32 is connected to chart 14 as shown at the fixed end 34 and wheel 18 is positioned relative to frame 10 by bearings 36 and 38.

To those versed in the art, the above description of the elements shown in their operating relation will indicate the operation and primarily the construction of the relatively moving elements. However, in order to clarify the description and indicate the value of the disclosed device to industry, the construction of the respective members and their cooperation will be discussed.

Figure 3:
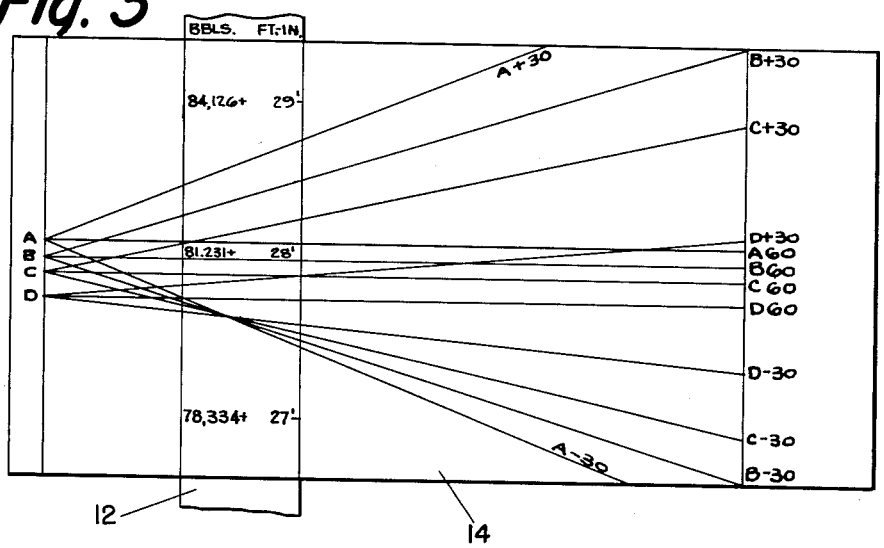
FIGURE 3 is a composite view in plan of a portion of the relatively movable elements in reading position.
Figure 4:
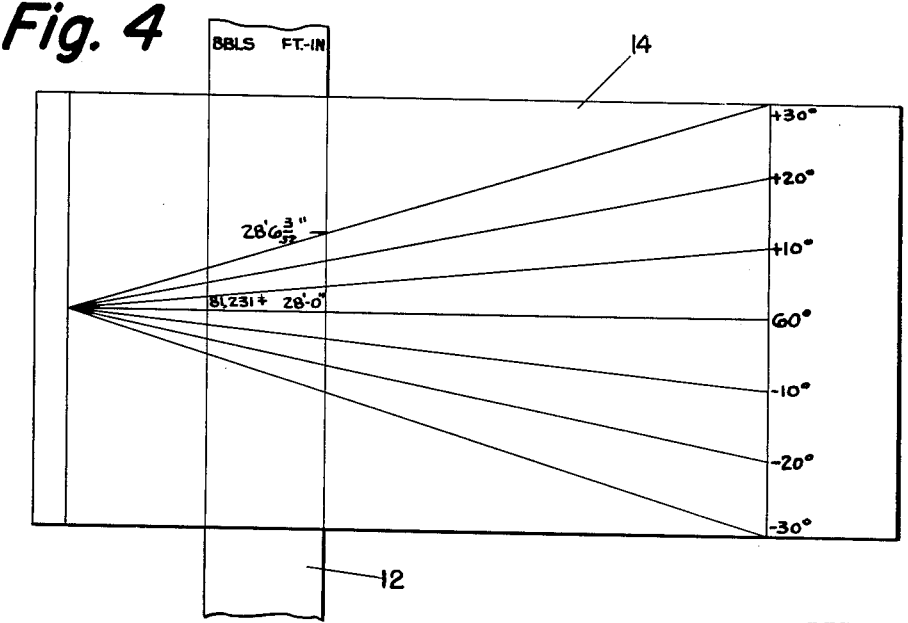
FIGURE 4 is a plan view of a chart in reading position.

As previously indicated and shown in FIGURES 3 and 4, tape 12 is scribed with indicia showing units of both depth and volume measurement. Any desired units may be shown. Feet and inches of depth and barrels in hundreds and thousands are used here as both are known and used. These indicia are preferably established for each tank separately. Thus the indicia are spaced on the tape to represent lineally the exact volume for every unit of tank depth. Unusual variations caused by tank shape or obstructions in the tank are considered. This is an exact basis of volume measurement, later to be corrected for temperature. It will be realized that graphic temperature corrections for unusually shaped tanks, such as spheroids, will be traced as curved lines, not straight. Cylindrical tanks require a straight line for the temperature correction graph.

Temperature affects any liquid stored in the tank. Its effect depends on the specific gravity of the stored liquid and varies in relation thereto. Hence a different chart is required to show the temperature effects on each of the liquids which are to be stored in the tank. This may be accomplishd by using a different chart 14 for each liquid stored, or by using a composite chart as indicated in FIGURE 3. A separate chart is recommended, but a composite chart is shown in this figure for simplicity in the explanation of the operation of the device.

Examination of chart 14 as it is shown in FIGURE 3 shows a plurality of graphs superimposed thereon. There are three lines lettered A, three lettered B, etc. Each of the groups of these lines bearing the same letter include a center line and two sloping lines meeting the center line at a point and extending away on an equal slope each side of the center line. The center lines of each of these lettered groups are separated from every other center line by a distance sufficient to make each group clearly legible on the chart.

In addition each group of lines is marked 60°+30°, and −30° showing the variation for a temperature variation effect of 30° above or below the normal of 60° which is accepted by hte petroleum industry. Wider variations or lesser may be adapted, depending on the climate in which the storage tank is constructed. These lines are the extremes used in temperate climates and, as shown in FIGURE 4, are the limits of a plurality of lines included between them and the center lines, not shown in FIGURE 3 which is intended to portray a variety of graphs each relating to a liquid of a different specific gravity.

The chart in FIGURE 4 shows a graph for one liquid, which is the recommended form the invention should take. The slopes of the lines numbered +10° to +30° and −10° to −30° relative to the 60° line are established for gasoline. Similar charts for use against the same tape in frame 10 for crude oil, naphthas of different volatilities and the like, should be plotted and inserted in the frame when such liquids are pumped into the storage vessel. The reading illustrated in FIGURE 4 indicates an average temperature of 90° in the stored gasoline or +30° above the 60° normal. As noted, the specific gravity of the gasoline was considered in laying out the slopes of the lines indicated. The depth of the liquid in the particular tank was measured at 28 feet, 6%₃₂ inches when the temperature was measured.

Tape 12 is then moved to place the feet and inch depth mark opposite the +30° slope line. This operation moves both the tape and the chart through the operation of cranks 24 or 26, toothed wheel 18, and threaded rod 32. The measurement once set, the corrected or normal amount acceptable for inventory or sales purposes is shown opposite the 60° line. This figure is shown here to be 28′-0″ true or corrected depth and a volume content of 81,231 barrels of liquid. It will be evident that the greater the temperature the more the volume of the volatile stored liquid is increased, needing reduction to reach the true volume. The converse of this is also true.

Because of the variations in storage volume available in tanks, a separate tape with a plurality of charts showing temperature effects on the different liquids to be stored is recommended. Where there is no variation in volumes or a negligible difference due to uniform structures, it may be possible to use one calculator for several storage tanks. As for approximate measurements, a single device could be used. Separate assemblies, where the tapes and charts are created for a particular storage tank, will give very accurate results.

From the above disclosure, it will be evident to those versed in this art that many alterations of the device are possible. As noted, different shapes of storage tanks require different graphs and tape indicia arrangements to give proper results. For cylindrical tanks, where the diameter is fixed, the only variable is in depth of the stored liquid. Such a problem permits a straight line graph for temperature correction and reasonably uniform spacing of depth and volume units on the cooperating tape. A preferred combination for establishing this graph and tape indicia combination is illustrated. Other means for accomplishing this result are readily imagined and within the limits of mechanical development not amounting to invention.

I claim:

1. A device for indicating the contents of a liquid storage tank corrected to standard temperature reading comprising a frame, a tape marked along the opposite longitudinal edges thereof with corresponding depth and volume unit indicia of the storage tank, a pair of opposed winding reels positioned to engage the ends of said tape, said reels being rotatably mounted on the frame and positioned to move the tape longitudinally thereof, means for manually rotating said reels, a transparent chart bearing correction curves for temperature effects on liquids of different specific gravities stored in the tank, means guiding said chart for sliding movement transversely to the frame in overlying reading cooperation with the tape, and gear means operatively connecting said tape and said chart and cooperably moving said chart in response to movement of said tape to bring a selected curve on said chart into registry with selected indicia on said tape.

2. A device for indicating the contents of a liquid storage tank corrected to standard temperature reading comprising a tape marked along the opposite longitudinal edges thereof with corresponding depth and volume unit indicia of the storage tank, spaced apart manually operable winding means attached to the ends of said tape for moving the same longitudinally thereof in either direction, a transparent chart bearing correction curves for temperature effects on liquids stored in the tank, means guiding said chart for sliding movement transversely to the tape in overlying reading cooperation therewith, and means operatively connecting said tape and said chart and cooperably moving said chart in response to movement of said tape to bring a selected curve on said chart into registry with selected indicia on said tape.

References Cited in the file of this patent

UNITED STATES PATENTS

| | | |
|---|---|---|
| 1,067,483 | Murphy | July 15, 1913 |
| 1,088,889 | Falvey et al. | Mar. 3, 1914 |
| 1,200,569 | Young | Oct. 10, 1916 |
| 1,470,839 | Hosch | Oct. 16, 1923 |
| 1,935,021 | Engblom | Nov. 14, 1933 |
| 2,030,466 | Paris | Feb. 11, 1936 |
| 2,699,894 | Hirsch | Jan. 18, 1955 |